United States Patent Office 3,843,488
Patented Oct. 22, 1974

3,843,488
SEPARATION OF PROPYLENE OXIDE FROM OTHER HYDROCARBONS
John P. Schmidt, New York, N.Y., and Alfredo Garcia, Jr., Chicago, Ill., assignors to Halcon International, Inc.
No Drawing. Continuation-in-part of abandoned application Ser. No. 586,035, Oct. 12, 1966. This application Sept. 7, 1967 Ser. No. 665,992
Int. Cl. B01d 3/34
U.S. Cl. 203—52                  15 Claims

ABSTRACT OF THE DISCLOSURE

Propylene oxide is purified by fractionation in the presence of a hydrocarbon having from 8 to 20 carbon atoms in the molecule.

---

This application is a continuation-in-part of Ser. No. 586,035 filed Oct. 12, 1966, and now abandoned.

BACKGROUND OF THE INVENTION

Propylene oxide is conventionally prepared by the epoxidation of propylene or by the dehydrohalogenation of propylene halohydrin. As an example of such preparation, there may be mentioned the reaction between propylene and oxidizing agents such as peroxides, peracids or hydroperoxides, and the reaction between propylene chlorohydrin and calcium hydroxide.

A disadvantage associated with processes involving the production of propylene oxide is the formation of by-products which are extremely difficult to separate from propylene oxide. These difficultly removable impurities are hydrocarbons and are believed to be propylene derivatives having from 5 to 7 carbon atoms per molecule. The $C_6$ compounds include hexenes, hexanes, methyl pentenes and methyl pentanes. All of these materials have boiling points sufficiently close to that of propylene oxide (about 35° C.) so that they are extremely difficult to separate from propylene oxide by direct fractionation. In some cases an azeotrope is formed, and complete separation is not possible by direct fractionation.

OBJECTS OF THE INVENTION

It is, therefore, an object of the present invention to provide a method for separating propylene oxide from propylene derivatives formed in its preparation. Another object is to provide a method for separating propylene oxide from hydrocarbons which contain 5 to 7 carbon atoms per molecule. A further object is to provide an improved method for purifying propylene oxide. These and other objects of the present invention will become apparent from the following description.

SUMMARY OF THE INVENTION

The present invention relates to the purification of propylene oxide and, more particularly, to the separation of propylene oxide from by-products formed in its preparation.

It has now been found that propylene oxide may be separated from hydrocarbons having from 5 to 7 carbon atoms per molecule by fractioning propylene oxide in the presence of a hydrocarbon having at least 8 and up to 20 carbon atoms per molecule. This latter hydrocarbon, herein referred to as the solvent hydrocarbon, may be an alkane, an alkene or a naphthene, or a mixture thereof. Preferably the hydrocarbon contains from 8 to 15 carbon atoms, and most preferably, from 8 to 10 carbon atoms.

DETAILED DESCRIPTION

As specific examples of suitable alkane hydrocarbons there may be mentioned octane, nonane, decane, undecane, dodecane, and branched-chain alkane isomers of any of these. As specific examples of alkene hydrocarbons there may be mentioned any of the mono-unsaturated compounds corresponding to the $C_8$–$C_{20}$ alkanes. Examples of suitable naphthenes are dimethyl cyclohexane, ethyl cyclohexane, methylethyl cyclohexane, diethyl cyclohexane, tetramethyl cyclohexane, dicyclohexyl, or any other naphthene having 8 to 20 carbon atoms. The separation of propylene oxide from difficultly removable $C_5$ to $C_7$ hydrocarbons is accomplished by distilling the impure propylene oxide in the presence of at least one part by weight of solvent hydrocarbon fed to the distilling column per three parts by weight of propylene oxide fed to the distilling column. Preferably the amount of solvent hydrocarbon is from about one part by weight to about 20 parts by weight per part by weight of propylene oxide. The fractionation may take place at atmospheric pressure, at elevated pressure, or at reduced pressure. Generally, pressures in the range of from about 3 p.s.i.a. to about 100 p.s.i.a. are preferred.

It has been found that the presence of a suitable solvent hydrocarbon in the distilling column acts to increase the volatility of propylene oxide relative to the volatilities of $C_5$ to $C_7$ hydrocarbons. As a result of this enhanced volatility, it is possible to recover essentially all of the propylene oxide fed to the column as an overhead stream containing negligible amounts of $C_5$ to $C_7$ hydrocarbons. Essentially all of the $C_5$–$C_7$ hydrocarbons in the propylene oxide feed stream can be removed in the column bottoms stream along with the solvent hydrocarbon. This bottoms stream may be further processed to separate the solvent hydrocarbon from the $C_5$–$C_7$ hydrocarbons, and the solvent hydrocarbon recovered therefrom may be recycled to the distillation column.

The following example illustrates the present invention without, however, limiting the same thereto.

Example 1

Tertiary butyl hydroperoxide is reacted with an excess of propylene in the presence of a soluble molybdenum catalyst. The reactor effluent is flashed to remove unreacted propylene and then fractionated to produce an overhead stream of crude propylene oxide and a bottoms stream comprising mainly t-butyl alcohol along with some catalyst and other reaction products. The crude propylene oxide stream, which contains about 95 weight percent propylene oxide, is analyzed by gas chromatography, and the analysis shows significant amounts of $C_5$ to $C_7$ hydrocarbons such as 2-methyl pentane and $C_6$ olefins, the total concentration of such hydrocarbons being less than one weight percent. A sample of the crude propylene oxide is processed in an Othmer-type recirculation still at atmospheric pressure to measure the volatilities of the impurities relative to the volatility of propylene oxide. A second sample of the crude propylene oxide is mixed with 9 parts by weight of n-octane per part by weight of crude propylene oxide, processed similarly in an Othmer Still, and the relative volatilities are measured. A third sample of the crude propylene oxide is mixed with 9 parts by weight of 1-octene and processed in similar fashion. A fourth sample of the crude propylene oxide is mixed with 9 parts by weight of ethyl cyclohexane and processed in similar fashion. Table I shows effect of added solvent hydrocarbons on the volatilities of several impurities in the crude propylene oxide. All volatilities are measured relative to propylene oxide.

TABLE I

| Solvent hydrocarbon | None | n-Octane | 1-octene | Ethyl-cyclo-hexane |
|---|---|---|---|---|
| Grams solvent hydrocarbon per gram of crude propylene oxide | | 9 | 9 | 9 |
| Relative volatility of component: | | | | |
| Propylene oxide | 1.00 | 1.00 | 1.00 | 1.00 |
| 2-methyl pentane | 1.39 | 0.49 | 0.76 | 0.61 |
| $C_6$ olefin "A" | 1.12 | 0.63 | 0.73 | 0.72 |
| $C_6$ olefin "B" | 0.83 | 0.48 | | |
| $C_7$ paraffin | 0.73 | 0.27 | 0.48 | |

The data in Table I show that the effect of the added solvent hydrocarbons is to increase the volatility of propylene oxide relative to that of the $C_6$-$C_7$ hydrocarbon impurities. For 2-methyl pentane the volatility relative to propylene oxide is about 1.39 at high concentrations of propylene oxide, but it is not possible to make a complete separation of propylene oxide from 2-methyl pentane by conventional fractionation because of the existence of an azeotrope.

When a sufficient amount of a suitable solvent hydrocarbon such as n-octane is added, however, the volatility of 2-methyl pentane relative to propylene oxide is sufficiently reduced so that the azeotrope is avoided, and an essentially complete separation of 2-methyl pentane from propylene oxide can be achieved in a fractionation column. For the $C_6$ olefin "B," which is believed to be a methyl pentene, the volatility relative to propylene oxide is about 0.83 at high concentrations of propylene oxide, indicating that there is no azeotrope but that complete separation by conventional fractionation would be very difficult. When a sufficient amount of a suitable solvent hydrocarbon such as n-octane is added, however, the volatility of the $C_6$ olefin relative to propylene oxide is sufficiently reduced so that a complete separation can readily be obtained by fractionation.

What is claimed is:

1. A process for purifying propylene oxide formed by the epoxidation of propylene and containing $C_5$ to $C_7$ hydrocarbon contaminants which comprises fractionating the impure propylene oxide in the presence of at least about one part by weight of an alkane, alkene or naphthene hydrocarbon having from 8 to 20 carbon atoms in the molecule per three parts by weight of propylene oxide and separating purified propylene oxide overhead.

2. A process according to claim 1 wherein the alkane, alkene or naphthene hydrocarbon is present in a quantity of from about 1 part by weight to about 20 parts by weight per 1 part by weight of propylene oxide.

3. A process according to claim 1 wherein the alkane, alkene or naphthene hydrocarbon has from 8 to 15 carbon atoms in the molecule.

4. A process according to claim 1 wherein the fractionation is carried out at pressures of from about 3 p.s.i.a. to about 100 p.s.i.a.

5. A process according to claim 1 wherein the epoxidation is effected by means of an organic hydroperoxide.

6. A process according to claim 3 wherein the alkane, alkene or naphthene hydrocarbon has from 8 to 10 carbon atoms in the molecule.

7. A process according to claim 6 wherein the impure propylene oxide is obtained by the epoxidation of propylene by means of an organic hydroperoxide, and contains propylene derivatives having from 5 to 7 carbon atoms in the molecule, the fractionation being carried out at pressures of from about 3 p.s.i.a. to about 100 p.s.i.a.

8. A method according to claim 1 wherein the hydrocarbon is octane.

9. In the fractional distillation of propylene oxide from hydrocarbons containing six carbon atoms and exhibiting boiling points equal to or near propylene oxide, the improvement which comprises distilling the mixture in the presence of an open chain or cyclic paraffin containing from 8 to 15 carbon atoms and which does not form an azeotrope with the propylene oxide or hydrocarbons, said paraffin being added in an amount sufficient to lower the volatility of the hydrocarbons relative to the propylene oxide to 0.72 or below and effect a separation of propylene oxide from the hydrocarbons, the purified propylene oxide being recovered as overhead and the bottoms comprising said paraffin and hydrocarbons.

10. A method according to claim 9 wherein the paraffin is a cyclic paraffin.

11. A method according to claim 9 wherein the amount of paraffin ranges from 1 to 20 parts per part propylene oxide in the feed.

12. A method according to claim 9 wherein the paraffin is an alcyclic compound selected from the group consisting of dimethyl cyclohexane, ethyl cyclohexane, methylethyl cyclohexane, diethyl cyclohexane, and tetramethyl cyclohexane.

13. A method according to claim 9 wherein the paraffin contains from 8 to 10 carbons.

14. A method according to claim 9 wherien the paraffin is octane.

15. A method according to claim 9 wherein the hydrocarbons are selected from the group consisting of methyl pentane and methyl pentene and mixtures thereof.

References Cited

UNITED STATES PATENTS

| | | | |
|---|---|---|---|
| 3,464,897 | 9/1969 | Jubin, Jr. | 203—52 |
| 3,039,940 | 6/1962 | Prinz et al. | 260—348 X |
| 3,351,635 | 11/1967 | Kollar | 260—348.5 |
| 3,337,425 | 8/1967 | Binning et al. | 260—348.5 X |
| 3,338,800 | 8/1967 | Binning et al. | 260—348.5 X |

NORMAN YUDKOFF, Primary Examiner

D. EDWARDS, Assistant Examiner

U.S. Cl. X.R.

203—68, 70; 260—348.5 L